(12) United States Patent
Wajs

(10) Patent No.: US 9,077,916 B2
(45) Date of Patent: Jul. 7, 2015

(54) IMPROVING THE DEPTH OF FIELD IN AN IMAGING SYSTEM

(75) Inventor: Andrew Augustine Wajs, Haarlem (NL)

(73) Assignee: Dual Aperture International Co. Ltd., Daejeon (KR)

( * ) Notice: Subject to any disclaimer, the term of this patent is extended or adjusted under 35 U.S.C. 154(b) by 17 days.

(21) Appl. No.: 13/144,499

(22) PCT Filed: Jan. 16, 2009

(86) PCT No.: PCT/EP2009/050502
§ 371 (c)(1),
(2), (4) Date: Sep. 27, 2011

(87) PCT Pub. No.: WO2010/081556
PCT Pub. Date: Jul. 22, 2010

(65) Prior Publication Data
US 2012/0008023 A1    Jan. 12, 2012

(51) Int. Cl.
| | |
|---|---|
| H04N 5/335 | (2011.01) |
| H04N 5/225 | (2006.01) |
| H04N 5/33 | (2006.01) |
| H04N 1/409 | (2006.01) |

(52) U.S. Cl.
CPC . *H04N 5/33* (2013.01); *H04N 1/409* (2013.01)

(58) Field of Classification Search
CPC ....... H04N 9/045; H04N 9/077; H04N 9/083; H04N 5/332; H04N 5/335
USPC ................. 250/338.1, 338.4, 208.1; 359/738; 348/222.1, 360, 342, 273–280, 370; 396/429
See application file for complete search history.

(56) References Cited

U.S. PATENT DOCUMENTS

| | | | |
|---|---|---|---|
| 3,971,065 A | 7/1976 | Bayer | |
| 6,393,160 B1 | 5/2002 | Edgar | |
| 7,773,317 B2* | 8/2010 | Duparre | 359/793 |
| 8,018,509 B2* | 9/2011 | Numata | 348/276 |
| 2002/0186976 A1* | 12/2002 | Seo | 396/429 |
| 2004/0169749 A1* | 9/2004 | Acharya | 348/279 |

(Continued)

FOREIGN PATENT DOCUMENTS

| | | |
|---|---|---|
| EP | 0858208 | 5/2002 |
| WO | 0172033 | 9/2001 |

(Continued)

OTHER PUBLICATIONS

International Search Report + Written Opinion issued in International Application No. PCT/EP2009/050502, mailed on Oct. 12, 2010.

(Continued)

*Primary Examiner* — Sinh Tran
*Assistant Examiner* — Xi Wang
(74) *Attorney, Agent, or Firm* — Steven M. Koehler; Westman, Champlin & Koehler, P.A.

(57) ABSTRACT

A method is described of capturing an image. The method comprising the steps of: exposing an image sensor to radiation from a first part of the electromagnetic spectrum using a first aperture and to radiation from a second part of the spectrum using a second aperture having a different size than the first aperture; and, forming an image on the basis of first image data generated by the radiation from the first part of the spectrum and second image data generated by radiation from the second part of the spectrum.

14 Claims, 5 Drawing Sheets

(56) References Cited

U.S. PATENT DOCUMENTS

| | | |
|---|---|---|
| 2005/0146634 A1 | 7/2005 | Silverstein |
| 2006/0132642 A1* | 6/2006 | Hosaka et al. ................ 348/370 |
| 2007/0019087 A1* | 1/2007 | Kuno et al. ................... 348/273 |
| 2007/0035852 A1* | 2/2007 | Farr .............................. 359/738 |
| 2007/0145273 A1* | 6/2007 | Chang ....................... 250/338.1 |
| 2008/0013943 A1 | 1/2008 | Rohaly et al. |
| 2008/0308712 A1* | 12/2008 | Ono .......................... 250/208.1 |
| 2010/0066854 A1* | 3/2010 | Mather et al. ............. 348/222.1 |
| 2010/0309350 A1* | 12/2010 | Adams et al. ................ 348/280 |
| 2011/0080487 A1* | 4/2011 | Venkataraman et al. .. 348/218.1 |
| 2012/0140099 A1* | 6/2012 | Kim et al. .................... 348/279 |
| 2012/0189293 A1* | 7/2012 | Cao et al. ..................... 396/333 |

FOREIGN PATENT DOCUMENTS

| | | |
|---|---|---|
| WO | 2007015982 | 2/2007 |
| WO | 2007104829 | 9/2007 |

OTHER PUBLICATIONS

Article Green et al., "Multi-aperture photography", ACM Transactions on Graphics, 26(3), Jul. 2007, pp. 68:1-68:7.

Japanese Office Action, mailed Jun. 4, 2013 in connection with Japanese Patent Application No. 2011-545639.

European Office Action dated Aug. 14, 2014 for corresponding European Application No. 09778959.

* cited by examiner

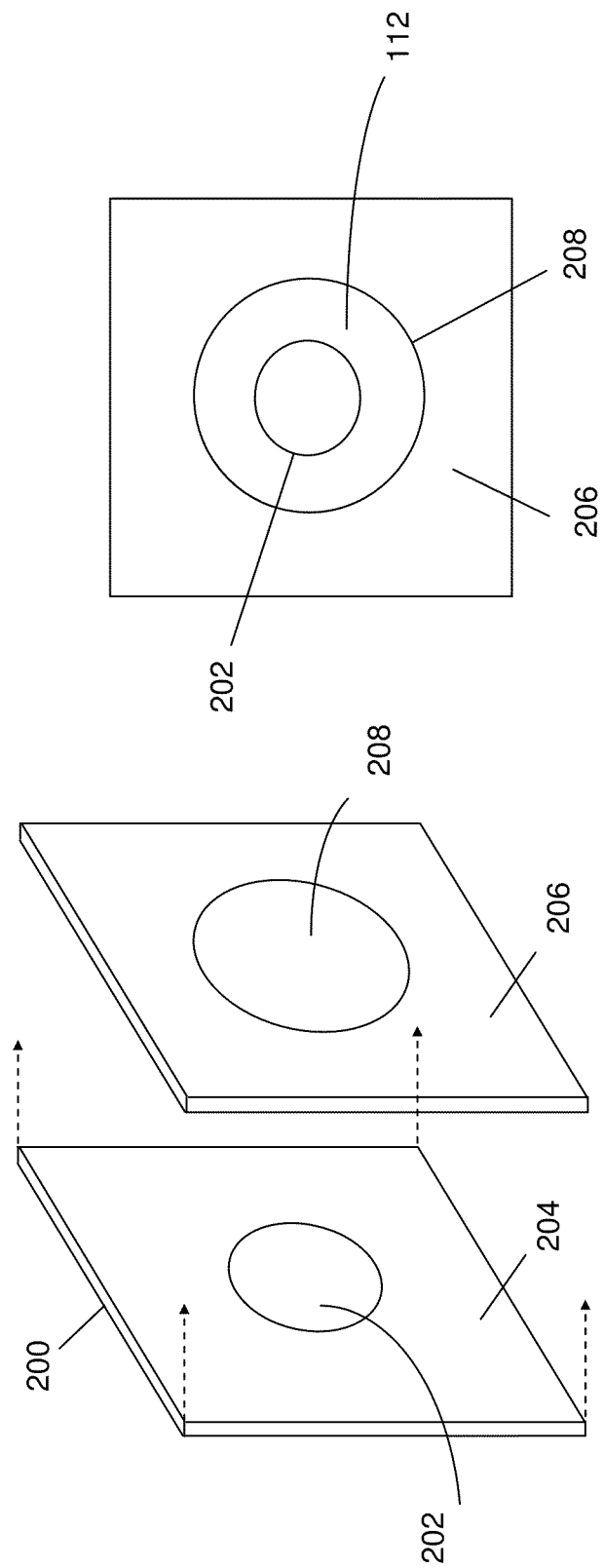

IMPROVING THE DEPTH OF FIELD IN AN IMAGING SYSTEM

PRIORITY CLAIM TO RELATED APPLICATIONS

This application is a national stage application under 35 U.S.C. §371 of PCT/EP2009/050502, filed 16 Jan. 2009, published as WO 2010/081556 A1 on 22 Jul. 2010.

FIELD OF THE INVENTION

The invention relates to improving the depth of field in an imaging system, and, in particular, though not exclusively, to a method for capturing an image having an improved depth of field, and an imaging system using such method.

BACKGROUND OF THE INVENTION

A limitation that exists in all optical systems used in cameras today is the tradeoff between aperture and the depth of field (DOF). An aperture determines the amount of light that enters the camera and the DOF determines the range of distances from the camera that are in focus when the image is captured. The wider the aperture (the more light received) the more limited the DOF.

In many applications the tradeoff between aperture and the DOF becomes apparent. For example, most mobile phones have fixed focus lenses so that only subject within a limited range is in focus. It also places a constraint on the aperture setting of the camera in that the camera must have a relatively small aperture to ensure that as many objects as possible are in focus. This tradeoff reduces the camera's performance in low light situations typically reducing the shutter speed by a factor of 4 or 8.

Further, in low light applications a wide aperture is required, which results in a loss of DOF. In pictures where objects are at different distances from the camera some of the objects will be out of focus even with a focusing lens. Wide aperture lenses require greater precision for optical performance and are therefore expensive.

Techniques to increase the DOF are known in the prior art. One technique referred to as "focus stacking" combines multiple images taken at subsequent points in time and at different focus distances in order to generate a resulting image with a greater depth of field DOF than any of the individual source images. Implementation of focus stacking requires adaptations of the camera electronics and substantial (non-linear) processing and image analyses of relatively large amounts of image data. Moreover, as the focus stacking requires multiple images taken at subsequent moments in time this technique is sensitive to motion blur.

Another approach is described in an article by Green et al., "Multi-aperture photography", ACM Transactions on Graphics, 26(3), July 2007, pp. 68:1-68:7. In this article the authors propose to increase the FOD using a system that simultaneously captures multiple images with different aperture sizes. The system uses an aperture splitting mirror which splits the aperture in a central disc and a set of concentric rings. The aperture splitting mirror however is complex to fabricate and produces high optical aberrations. Moreover, implementation of such splitting mirror in a camera requires a relative complex optical system which requires precise alignment.

Hence, there is a need in the prior art for a simple and cheap methods and systems for improving the depth of field in an imaging system.

SUMMARY OF THE INVENTION

It is an object of the invention to reduce or eliminate at least one of the drawbacks known in the prior art and to provide in a first aspect of the invention a method of capturing an image. The method comprises the steps of: exposing an image sensor to radiation from a first part of the electromagnetic spectrum using a first aperture and to radiation from a second part of the spectrum using a second aperture having a different size than the first aperture; and, forming an image on the basis of first image data generated by the radiation from the first part of the spectrum and second image data generated by radiation from the second part of the spectrum.

By exposing an image sensor with radiation from two different apertures the DOF of the optical system can be improved in an very simple way. The method allows a fixed focus lens to have a relatively wide aperture, hence effectively operating in lower light situations, while at the same time providing a greater DOF resulting in sharper pictures. Further, the method effectively increase the optical performance of lenses, reducing the cost of a lens required to achieve the same performance.

In one embodiment the image sensor is simultaneously exposed by radiation from the first and second aperture. One exposure of the image sensors allows efficient capturing of both small aperture and large aperture image information thus reducing effects of motion blur which occur when using conventional techniques like focus stacking.

In another embodiment the method further comprising the steps of: subjecting the first image data to a high pass filter; adding the filtered high frequency components of the first image data to the second image data. Using this embodiment, the sharp image information can be easily accessed via the high-frequency information produced by the small aperture image data.

In yet another embodiment, the first aperture is adapted to control exposure of radiation from a part in the infra-red spectrum and wherein the second aperture is adapted to control exposure to radiation from a part in the visible spectrum. Further, in an embodiment the second aperture is formed by partly covering a substrate with a filter reflecting infra-red radiation and transmitting visible radiation. The optical characteristics of the aperture system can be easily modified and optimized with regard to the type of image sensor and/or optical lens system used in an optical system. One embodiment employs the sensitivity of silicon image sensors to infra-red radiation.

In a further embodiment the image sensor used in the method comprises a pixel array coupled to a filter array, each filter in the filter array being adapted to pass radiation of a part of the spectrum and wherein the filter array comprising one or more color filters configured to pass radiation in a color band and/or one or more infra-red filters configured to reflect visible radiation and to transmit infra-red radiation. The filter array may be easily optimized for a particular aperture configuration.

In yet a further embodiment the method comprises the steps of: determining first image data from pixels responsive to radiation in one or more infra-red bands; determining second image data from the pixels responsive to radiation in one or more color bands; subjecting the first image data to a high frequency filter; adding the filtered high frequency components of the first image data to the second image data, preferably the color components of the second image data.

In another aspect the invention relates to an aperture system for controlling the exposure of an image sensor to radiation. The aperture system comprises: at least a first aperture for controlling exposure of the image sensor to radiation from a first part of the spectrum, and; a least a second aperture for controlling exposure to radiation from a second part of the spectrum, the first and second apertures being different in size.

In one embodiment the aperture system comprises a transparent substrate wherein the substrate comprises an opening defining the first aperture, the substrate comprising a filter, preferably a thin film filter, defining a second aperture. In another embodiment, aperture system comprises a transparent substrate, a first part of the substrate being covered by a first thin film filter defining the first aperture and a second part of the substrate being covered with a second thin film filter defining a second aperture.

Thin film technology allow easy adaptation of the optical characteristics of the aperture system. In one embodiment, at least one of the filters is configured as a tunable filter comprising dielectric layers arranged between polymer layers, wherein the polymer layers serve as elastic springs and wherein the thickness between the dielectric layers is controlled by applying a voltage to the multi-layered system. In another embodiment, at least one aperture of the aperture system is configured as an adjustable aperture, the adjustable aperture comprising a hole in a sheet of an electro-active material wherein the size (diameter) of the hole is controlled by applying a voltage over the sheet.

In yet another aspect the invention relates to an image sensor for use with an aperture system as described above. The image sensor comprises: a pixel array, preferably a two-dimensional pixel array, wherein each pixel comprises at least one photosensitive element; a filter array coupled to the pixel array, the filter array comprises blocks of pixel filters, wherein each block comprises one or more color filters, each color filter adapted to pass radiation in color band and one or more infra-red pass filters adapted to reflect radiation in the visible spectrum and to pass radiation in an infra-red band.

The invention further relates to an imaging system, comprising an image sensor; a lens system for focusing radiation onto the image sensor; and, an aperture system as described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIGS. 2A and 2B depict an aperture system according to one embodiment of the invention.

FIGS. 4A and 4B depict filter array configurations for an image sensor according to one embodiment of the invention.

DETAILED DESCRIPTION

Figure 1:
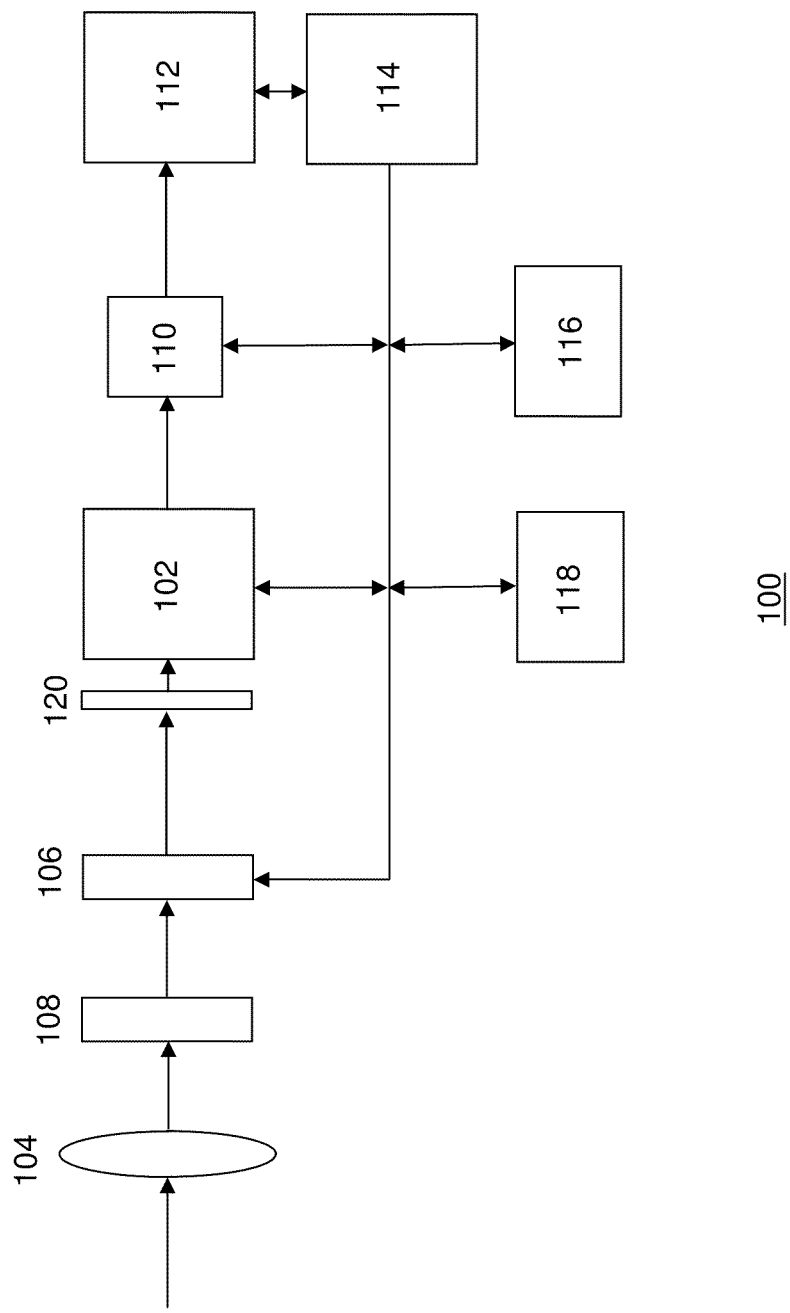
FIG. 1 depicts a an imaging system according to one embodiment of the invention.

FIG. 1 illustrates an imaging system 100 according to one embodiment of the invention. The imaging system comprises an image sensor 102, a lens system 104 for focusing objects in a scene onto the imaging plane of the image sensor, a shutter 106 and an aperture system 108 with two or more apertures for allowing radiation into the imaging system. The imaging system may be part of a digital camera or integrated in a mobile phone, a webcam and other multimedia devices requiring image capturing functionality.

The shutter may be a mechanical shutter or, alternatively, the shutter may be an electronic shutter integrated in the image sensor. The image sensor comprises rows and columns of photosensitive sites (pixels) forming a two dimensional pixel array. The image sensor may be an CMOS (Complimentary Metal Oxide Semiconductor) active pixel sensor or an CCD (Charge Coupled Device) image sensor.

When the radiation is projected by the lens system onto the image sensor, each pixel produces an electrical signal which is proportional to the electromagnetic radiation (energy) incident on that pixel. The signals received from the pixels are sampled and quantized and transformed into words of a digital format using one or more Analog to Digital (A/D) converters 110, which may be integrated on the chip of the image sensor. The digitized image data are processed by a digital signal processor 112 (DSP) coupled to the image sensor, which is configured to perform signal processing functions such as interpolation, white balance, brightness correction, data compression techniques (e.g. MPEG or JPEG type techniques), etc. The DSP is coupled to a central processor 114, storage memory 116 for storing captured images and a program memory 118 such as EEPROM or another type of nonvolatile memory comprising one or more software programs used by the DSP for processing the image data or used by a central processor for managing the operation of the imaging system.

In order to obtain color information and separate the color components of an image, a color filter array 120 (CFA) is interposed between the lens and the image sensor. Typically, the color filter array is integrated with the image sensor such that each pixel of the image sensor has a corresponding pixel filter. Each color filter is adapted to pass radiation of a predetermined color band into the pixel. Usually a combination of red, green and blue (RGB) filters is used, however other filter schemes are also possible, e.g. CYGM (cyan, yellow, green, magenta), RGBE (red, green, blue, emerald), etc.

A commonly used CFA is the Bayer color filter. The disposition of the color pixel filters in the Bayer CFA is described in U.S. Pat. No. 3,971,065, which is hereby incorporated by reference. The Bayer CFA is divided in blocks of four pixel filters wherein each block comprises a blue, a red and two green pixel filters. To reconstruct a color image from an image generated using a Bayer CFA, the additional two colors that are missing from each pixel are interpolated from the adjacent pixels. This color image reconstruction process is also referred to as demosaicking, which is a technique well known in the art.

Each pixel of the exposed image sensor produces an electrical signal proportional to the electromagnetic radiation passed through the color filter associated with the pixel. The array of pixels thus generate image data (a frame) representing the spatial distribution of the electromagnetic energy (radiation) passed through the color filter array. For reasons explained below, the imaging system 100 allows infra-red radiation or at least part of the infra-red radiation to enter the imaging system. Consequently, the imaging system does not use an filter in front of lens system which completely blocks infra-red radiation. The electromagnetic radiation 122 entering the imaging system via the lens system may thus be both radiation from the visible and the infra-red parts of the optical spectrum. Exposing the image sensor for a certain exposure time to radiation results in at least one image frame.

The exposure of the image sensor is controlled by a the shutter and the two or more apertures of the aperture system. When the shutter is opened, these apertures control the amount of radiation and the degree of collimation of the radiation exposing the image sensor. In one embodiment the imaging system comprises an aperture system comprising two apertures. This dual aperture system is schematically depicted in FIG. 2A. In one embodiment, the dual aperture system comprises a substrate 200 with an opening 202 (e.g. a circular hole) in the middle. The substrate material may be transparent to at least visible radiation and may be coated by a thin film filter material 204 such as a dielectric filter. In one embodiment the substrate is coated with a dichroic filter which reflects radiation in the infra-red spectrum and transmits radiation in the visible spectrum. Dichroic filters also referred to as interference filters are well known in the art and typically comprise a number of thin-film dielectric layers of specific thicknesses which are configured to reflect infra-red radiation (e.g. radiation having a wavelength between approximately 750 to 1250 nanometers) and to transmit radiation in the visible part of the spectrum.

In a further embodiment, the filter may comprise a polymer nano-composite thin film mirror for the infra-red region. Such polymer based thin film mirror is for example described e.g. in the article by Mandzy et. al, "Polymer nanocomposite thin film mirror for the infra-red regions" (pre-print of May 2007 by the University of Kentucky). The polymer nano-composite mirror reflects infra-red radiation while transmitting visible radiation and comprises substantially spherical metal oxide nano-particles (e.g. titaniumoxide) with narrow size distributions dispersed in a continuous matrix of an acrylate polymer. These filters can be made by low cost fabrication techniques and are especially suitable for plastic and/or flexible substrates.

The substrate may be positioned before the lens in the imaging system using a holder 206 of an opaque material. The holder comprises a circular opening 208 and is configured to receive and position the substrate such that the opening in the substrate is located in the center of the circular opening of the holder. As the diameter of the holder opening is large than the diameter of the substrate opening, part of the filter coated substrate is exposed by radiation entering the imaging system via the lens. The exposed part forms a concentric ring 210 around the substrate hole.

Radiation of the visible and the non-visible infra-red spectrum enters the imaging system via the aperture system. As the dichroic infra-red blocking filter used in the aperture system is transparent for visible light, the amount of radiation in the visible spectrum entering the imaging system is controlled by the diameter of the holder opening. On the other hand, as the filter blocks infra-red radiation, the amount of radiation in the infra-red spectrum entering the imaging system is controlled by the diameter of the opening in the substrate which is smaller than the diameter of the holder opening. Hence, contrary to a conventional imaging system which uses a single aperture, usually in combination with an infra-red filter for blocking the infra-red radiation, the imaging system according to the invention uses an aperture system comprising two or more apertures of different sizes for controlling the amount and the collimation of radiation in different bands of the spectrum exposing the image sensor. The invention thus allows a simple mobile phone camera with a typical f-number of 7 (e.g. focal length f of 7 mm and a diameter of 1 mm) to improve its DOF via a second aperture with a f-number varying e.g. between 14 for a diameter of 0.5 mm up to 70 or more for diameters equal to or less than 0.2 mm, wherein the f-number is defined by the ratio of the focal length f and the effective diameter of the aperture.

Preferable implementations of the invention include optical systems comprising an f-number for the visible radiation of approximately 2 to 4 for increasing the sharpness of near objects in combination with an f-number for the infra-red aperture of approximately 16 to 22 for increasing the sharpness of distance objects.

In further embodiment, the aperture system may comprise a transparent substrate with two different thin-film filters: a first circular thin-film filter in the center of the substrate forming a first aperture transmitting radiation in a first band of the spectrum and a second thin-film filter formed (e.g. in a concentric ring) around the first filter transmitting radiation in a second band of the spectrum. The first filter may be configured to transmit both visible and infra-red radiation and the second filter may be configured to reflect infra-red radiation and to transmit visible radiation. The outer diameter of the outer concentric ring may be defined by an opening in an opaque aperture holder or, alternatively, by the opening defined in an opaque thin film layer deposited on the substrate which both blocks infra-read and visible radiation.

In yet another embodiment, the aperture element may comprise a plurality of thin-film filter apertures formed as concentric rings around an opening or a circular thin-film filter. Each thin-film filter ring forms an aperture and may be adapted to control the amount and collimation of radiation in a particular band of the spectrum onto the image sensor. For example, a three aperture system may be formed by a first circular filter transparent for both visible and infra-red radiation, a second filter formed around the first filter reflecting infra-red and transmitting visible radiation and a third filter formed around the second filter reflecting red and infra-red and transmitting green and blue radiation. Other embodiments include filters for the near infra-red (NIR), mid infrared (MIR) and/or the far infra-red (FIR).

In further variants, the filters used to define the apertures may control further predetermined optical properties. For example, the polarization of the radiation entering the optical system may be controlled by the one or more filters used to define the aperture system. In one embodiment the dichroic filter may be a polarizing infra-red filter.

In a further embodiment the one or more filters used in the aperture system may comprise a tunable infra-red filter. Such tunable filter may comprise dielectric layers between polymer layers which serve as elastic springs allowing the thickness between the dielectric layers to be controlled by applying a voltage to the multi-layered system. An implementation of tunable infra-red system is described in the article by Almarsi et al., "Tunable infrared filter based on elastic polymer springs", SPIE, San Diego, US March 2005, Vol. 5770, pp. 190-198.

In a yet a further embodiment, the aperture system may comprise an adjustable aperture. Such adjustable aperture is known from WO2007/104829 and is formed by an electroactive material, e.g. an transparent electro-restrictive polymer sheet, which comprises a hole and which is placed between two transparent electrodes. The polymer sheet may comprise a polymer nano-composite thin film filter as described above which reflects infra-red and transmits visible light. When applying a voltage to the electrodes an electrical field will cause the sheet to deform (i.e. expand and/or retract) thereby allowing the size of the hole (aperture) in the sheet to be controlled by the voltage applied to the electrodes.

The multi-aperture according to the invention may be formed by using several separate aperture elements, e.g. a first transparent substrate comprising a first circular filter coating in optical alignment with a second transparent substrate comprising a second circular filter and the one or more lenses of the optical system thereby effectively providing the same effect as the dual aperture system as described in relation with FIG. 2A. Alternatively, the aperture system may be integrated with lens by using the lens as a substrate for the first and second filter coatings forming the aperture system.

It is understood that the invention may be easily extended to an optical system comprising two or more lens systems, e.g. a first lens system with associated first aperture system and a second lens system with associated second aperture system.

Figure 2B:
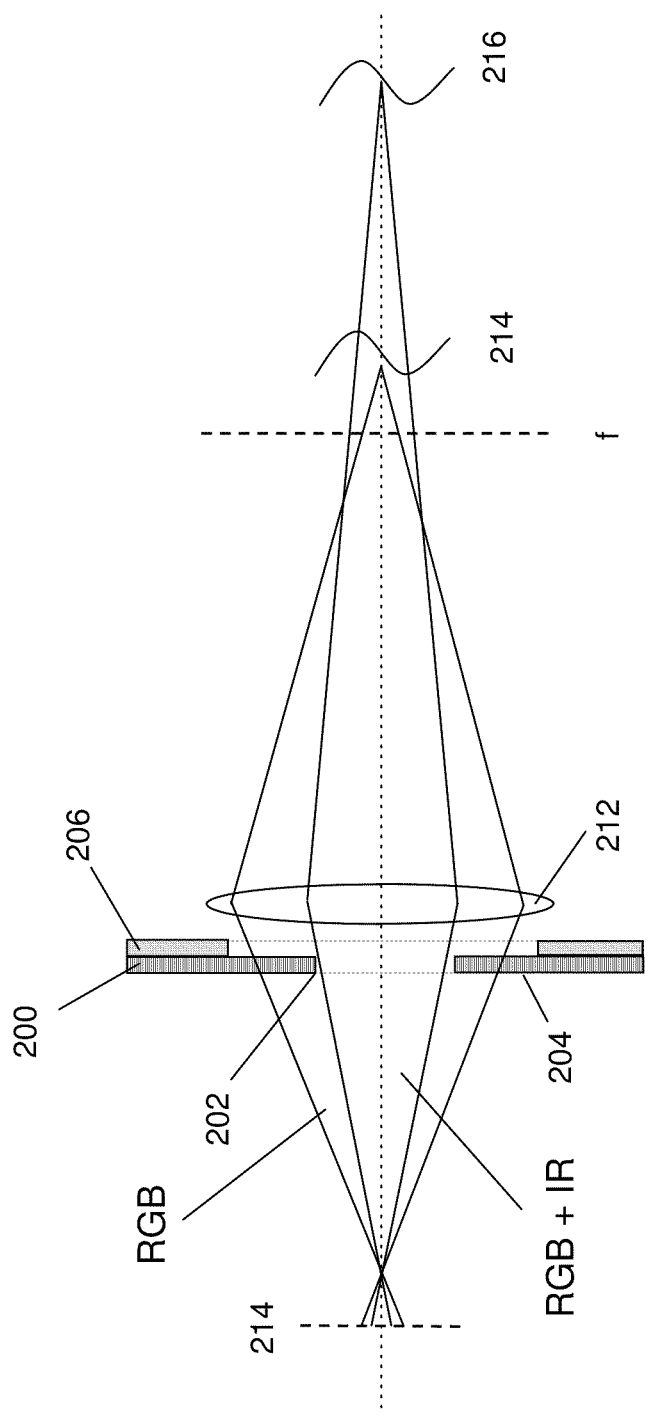

The dual aperture system as depicted in FIG. 2A may be used to improve the DOF of the imaging system. This is schematically depicted in FIG. 2B. Radiation in the visible and infra-red spectrum enters the imaging system via the dual aperture system comprising a filter-coated transparent substrate 200 with a circular hole 202 of a predetermined diameter. The filter 204 transmits visible radiation and reflects infra-red radiation. The opaque covering 206 comprising a circular opening with a diameter which is larger than the diameter of the hole 202. The cover may be thin film coating which reflects both infra-red and visible radiation or may be part of a holder for holding and positioning the substrate 200 in the optical system. Radiation in the visible and infra-red spectrum passes the aperture system and is subsequently projected by the lens 212 onto the imaging plane 214 of the image sensor. The pixels of the image sensor thus receive a first (relatively) wide-aperture visible radiation image signal 216 with a limited DOF overlaying a second small-aperture infra-red radiation image signal 218 with a large DOF. Hence, objects 214 close to the plane of focus f of the lens are projected onto the image plane with relatively small defocus blur by the visible radiation, while objects 216 further located from the plane of focus are projected onto the image plane with relatively small defocus blur by the infra-red radiation. Upon exposure the image sensor captures both visible and infra-red image signals simultaniously in one image frame. Thereafter, the different captured color and infra-red components of the image frame may be separated and processed by the DSP. By combining the (visible) color components with the (non-visible) infra-red components an image may be produced with improved DOF. The principle illustrated in FIG. 2A may be easily extended to a multi-aperture system which may be configured to project objects at various distances from the focus plane with a small defocus blur onto the image plane of the image sensor.

When using a conventional color image sensor comprising e.g. a Bayer color filter array as described above in relation with FIG. 1, infra-red radiation received by the image sensor is mainly transmitted by the red pixel filters. Hence, the red color component of the captured image frame comprises both a high-amplitude visible red signal and sharp, low-amplitude non-visible infra-red signal. Typically, the infra-red component will be 8 to 16 times lower than the visible red component. The red balance may be adjusted to compensate for the slight distortion created by the presence of infra-red.

Figure 3:
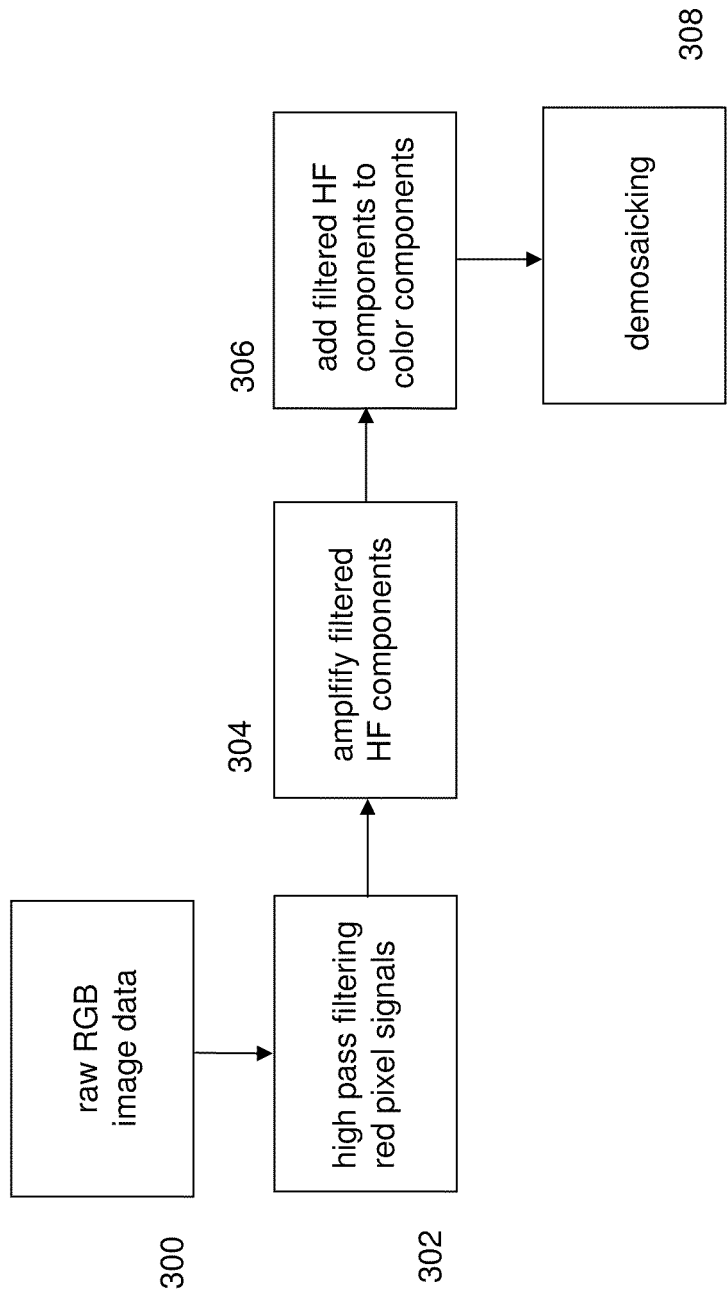
FIG. 3 depicts a flow diagram a method according to one embodiment of the invention.

The image processing of the captured image is schematically depicted in the flow diagram of FIG. 3. In a first step 300 Bayer filtered raw image data are captured. Thereafter, the DSP generates a copy of the signals produced by the red pixels and passes these signals through a high pass filter (step 302) in order to extract the high-frequency components of the infra-red image signal which comprises the sharpness information of the infra-red image. As the relatively small size of the infra-red aperture produces a relatively small infra-red image signal, the filtered high-frequency components are amplified in proportion to the ratio of the visible light aperture relative to the infra-red aperture (step 304).

The effect of the relatively small size of the infra-red aperture is partly compensated by the fact that the band of infra-red radiation captured by the red pixel is approximately four times wider than the band of red radiation (typically a digital infra-red camera is four times more sensitive than a visible light camera).

After amplification, the amplified high frequency components derived from the infra-red image signal are added to (blended with) each color component of the Bayer filtered raw image data (step 306). Thereafter, the combined image data may be transformed into a full RGB color image using a demosaicking algorithm well known in the art (step 308).

In a variant (not shown) the Bayer filtered raw image data are first demosaicked into a RGB color image and subsequently combined with the amplified high frequency components by addition (blending).

This method allows an imaging system with a fixed focus lens to have a wide aperture, hence operate effectively in lower light situations, while at the same time to have a greater DOF resulting in sharper pictures. Further, the method effectively increase the optical performance of lenses, reducing the cost of a lens required to achieve the same performance.

In another embodiment, the Bayer filtered raw image data may be first demosaicked in an RBG color image and then transformed to a suitable color space, for example an LAB color space, which is based on the CIE 1931 XYZ color space defined by the Commission International de l' éclairage and designed to approximate human vision. Thereafter, the high frequency infra-red components are added to the L (lightness contrast) component of the LAB color image.

The method of improving the DOF according to the present invention may also be applied to image sensor configurations other than Bayer-type color sensors. In one embodiment, the multi-aperture element may be used in combination with an image sensor comprising an CFA as described in US2007/0145273 or WO2007/015982. These CFAs are designed to increase the sensitivity of the color image sensor by combining red, green, blue (RGB) pixels with one or more monochrome pixels which are sensitive to the whole visible spectrum or the visible spectrum and non-visible (infra-red) spectrum.

Such CFA schemes using monochrome pixels may be used in combination with a multi-aperture system according to the present invention. For example, when using a dual aperture system as described in relation to FIGS. 2A and 2B, the sharp small aperture infra-red image signal is captured by the red pixels and the monochrome pixel. These signals are high pass filtered and added to the color components of the visible image signal.

Figures 4A, 4B:
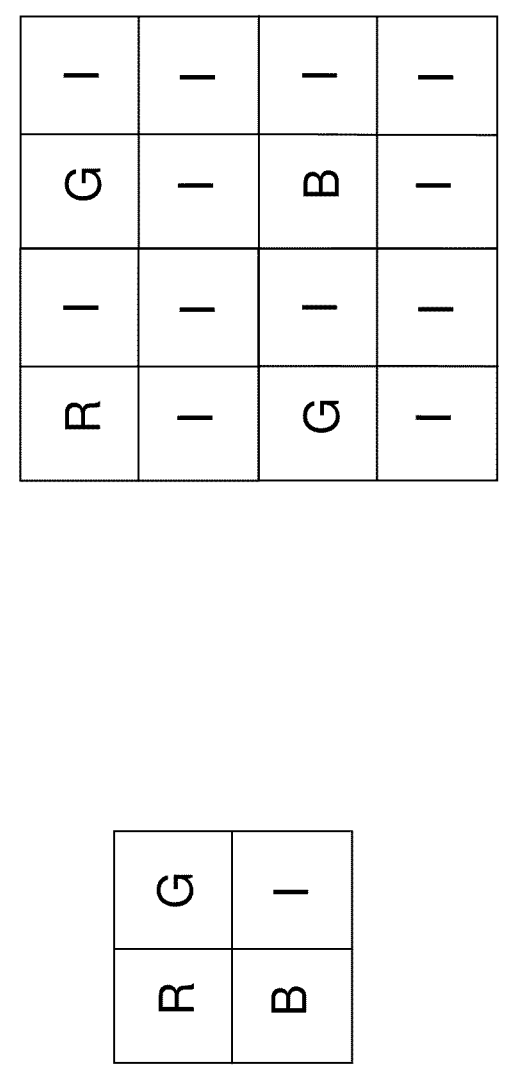

In another embodiment the imaging system may use an image sensor which is optimized for use with a multi-aperture element. In this variant the image sensor comprises visible color pixels (e.g. RGB, CYGM, etc.) in conjunction with one or more infra-red (I) pixels. The CFA may comprise blocks of pixels, e.g. 2×2 pixels, each block comprising a red, green, blue and infra-red pixel. An example of such RGBI block is depicted in FIG. 4A. The infra-red pixel is formed by a pixel connected to an infra-red (I) pass filter. Such filter may be a dielectric filter configured to reflect visible radiation while transmitting infra-red radiation. The sharp small-aperture infra-red image signal may be obtained from the high pass filtered components of the red pixel and the infra-red pixel signals. This signal may be used to increase the DOF. The infra-red image signals produced by the infra-red pixels may be used to efficiently eliminate the color distortion in the color pixels created by the infra-red radiation by subtracting these signals from each color component of the color image signal. Using an image sensor with such optimized RGBI filter array in combination with an multi-apertures system thus allows the generation of an color image with improved DOF, SNR and color balance.

In a further embodiment, the sensitivity of the image sensor to infra-red may be increased by increasing the number of infra-red pixels in a block. In one configuration the image sensor filter array may comprise blocks of sixteen pixels, four color pixels RGGB and twelve infra-red pixels. A preferred embodiment of such RGBI block is depicted in FIG. 4B.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of capturing an image, the method comprising:
    exposing an image sensor to radiation from a first part of the electromagnetic spectrum using at least a first aperture and to radiation from a second part of the spectrum using at least a second aperture having a different size than the first aperture, wherein the first and second apertures are overlapping;
    forming one image on the basis of first image data generated by the image sensor in response to the radiation from the first part of the spectrum and second image data generated by the image sensor in response to the radiation from the second part of the spectrum by blending selected frequency components of the first image data with the second image data.

2. The method according to claim 1, wherein the image sensor is simultaneously exposed to radiation from the first and second aperture.

3. The method according to claim 1, further comprising:
    subjecting the first image data to a high pass filter;
    wherein blending selected frequency components of the first image data with the second image data comprises adding filtered high frequency components of the first image data to the second image data.

4. The method according to claim 1, wherein exposing comprises controlling exposure of radiation from the first part of the spectrum with the first aperture and controlling exposure to radiation from the second part of the spectrum with the second aperture.

5. The method according to claim 4, wherein the first part of the spectrum comprises a part in the infra-red spectrum and/or the second part of the spectrum comprises a part in the visible spectrum.

6. The method according to claim 1, wherein exposing comprises passing electromagnetic radiation through an opening in a substrate comprising the first aperture and reflecting radiation in the first part of the spectrum and transmitting radiation in the second part of the spectrum using a filter partly covering the substrate.

7. The method according to claim 1, wherein exposing comprises reflecting radiation in the first part of the spectrum and transmitting radiation in the second part of the spectrum using a filter partly covering a substrate.

8. The method according to claim 7, wherein the first part of the spectrum comprises a part in the infra-red spectrum and/or the second part of the spectrum comprises a part in the visible spectrum.

9. The method according to claim 1, wherein the image sensor comprises a pixel array coupled to a filter array, each filter in the filter array filtering the electromagnetic radiation to pass radiation of a part of the spectrum.

10. The method according to claim 9, wherein filtering the electromagnetic radiation comprises filtering the electromagnetic radiation to pass radiation in a color band and/or to reflect visible radiation and to transmit infra-red radiation.

11. The method according to claim 10, further comprising:
    determining the first image data from pixels responsive to radiation in one or more infra-red bands;
    determining the second image data from the pixels responsive to radiation in one or more color bands;
    subjecting the first image data to a high frequency filter;
    wherein blending the selected frequency components comprises blending filtered high frequency components of the first image data with the second image data.

12. The method according to claim 11, wherein blending the filtered high frequency components of the first image data with the second image data comprises blending the filtered high frequency components of the first image data with the color components of the second image data.

13. An imaging system, comprising:
    an image sensor;
    a lens system for focusing radiation onto the image sensor; and,
    an aperture system configured to control exposure of the image sensor to radiation, the aperture system comprising:
        at least a first aperture configured to control exposure of the image sensor to radiation from a first part of the spectrum, and;
        at least a second aperture configured to control exposure of the image sensor to radiation from a second part of the spectrum, wherein the first and second apertures are overlapping and different in size:
    a processor configured to form one image on the basis of first image data generated by exposing the image sensor to the radiation from the first part of the spectrum and second image data generated by exposing the same image sensor to radiation from the second part of the spectrum.

14. The imaging system according to claim 13, wherein the imaging system is configured to simultaneously expose the image sensor to radiation from the first and second apertures of the aperture system.

* * * * *